United States Patent

Owen

[11] Patent Number: 5,874,371
[45] Date of Patent: Feb. 23, 1999

[54] REMOVABLE, NON-SKID, NON-ADHESIVE COVERING

[75] Inventor: Thomas Hendrix Owen, Plymouth, Ind.

[73] Assignee: D.W. Wallcovering, Inc., Louisville, Ky.

[21] Appl. No.: 752,648

[22] Filed: Nov. 19, 1996

Related U.S. Application Data

[63] Continuation of Ser. No. 542,400, Oct. 11, 1995, Pat. No. 5,601,908.

[51] Int. Cl.$^6$ ........................................................ B32B 3/10
[52] U.S. Cl. .......................... 442/101; 442/19; 428/904.4
[58] Field of Search .............................. 442/12, 19, 101; 428/904.4, 109, 110, 111, 373

[56] References Cited

U.S. PATENT DOCUMENTS

| | | | |
|---|---|---|---|
| 1,499,166 | 6/1924 | Frazier . | |
| 2,759,866 | 8/1956 | Seymour | 428/904.4 X |
| 3,160,548 | 12/1964 | Gillick, Jr. et al. | 428/904.4 X |
| 3,483,018 | 12/1969 | Waldman | 117/68.5 |
| 3,616,146 | 10/1971 | Gabet | 161/88 |
| 3,716,132 | 2/1973 | Lewyckyj | 206/58 |
| 3,814,661 | 6/1974 | Hart, Jr. | 161/191 |
| 3,932,247 | 1/1976 | Oshima | 156/148 |
| 4,054,697 | 10/1977 | Reed et al. | 428/40 |
| 4,116,743 | 9/1978 | Davis | 156/333 |
| 4,234,649 | 11/1980 | Ward | 428/255 |
| 4,296,162 | 10/1981 | Jean | 428/213 |
| 4,307,145 | 12/1981 | Goldman | 428/904.4 X |
| 4,316,926 | 2/1982 | Kaminstein | 428/137 |
| 4,348,445 | 9/1982 | Craig | 428/138 |
| 4,380,564 | 4/1983 | Cancio et al. | 428/167 |
| 4,460,643 | 7/1984 | Stevens et al. | 428/904.4 X |
| 4,465,729 | 8/1984 | Cancio et al. | 428/167 |
| 4,515,852 | 5/1985 | Katabe et al. | 442/101 |
| 4,603,074 | 7/1986 | Pate et al. | 428/904.4 X |
| 4,668,547 | 5/1987 | Brouessard | 428/904.4 X |
| 4,675,232 | 6/1987 | Edenbaum et al. | 428/317.3 |
| 4,705,715 | 11/1987 | Decoste, Jr. et al. | 428/246 |
| 4,783,354 | 11/1988 | Fagan | 428/40 |
| 5,120,587 | 6/1992 | McDermott, III et al. | 428/40 |
| 5,169,699 | 12/1992 | Prince | 428/68 |
| 5,346,278 | 9/1994 | Dehondt | 297/219.1 |
| 5,364,681 | 11/1994 | Pate et al. | 428/904.4 X |
| 5,518,799 | 5/1996 | Finestone et al. | 428/904.4 X |
| 5,632,844 | 5/1997 | Pate et al. | 428/904.4 X |
| 5,707,903 | 1/1998 | Schottenfeld | 442/30 |

FOREIGN PATENT DOCUMENTS

| | | | |
|---|---|---|---|
| WO/97/24226 | 7/1997 | WIPO | B32B 3/10 |

OTHER PUBLICATIONS

Easy Liner from Manco, Inc., Avon, Ohio. This product is believed to have been sold and/or offered for sale in the United States since about Sep. 1994.

*Primary Examiner*—Daniel Zirker
*Attorney, Agent, or Firm*—Darby & Darby

[57] ABSTRACT

A covering for use on a surface is provided. The covering is removable, non-skid, and non-adhesive. The covering includes a substrate having a front surface and a back surface. The substrate is non-skid coated. A decorative top sheet is adhered to the substrate.

11 Claims, 2 Drawing Sheets

REMOVABLE, NON-SKID, NON-ADHESIVE COVERING

This is a continuation, of application Ser. No. 08/542,400, filed Oct. 11, 1995, now U.S. Pat. No. 5,601,908.

FIELD OF THE INVENTION

This invention relates to removable, non-skid, non-adhesive coverings which are used, for example, as shelf liners.

BACKGROUND OF THE INVENTION

Currently available coverings or liners are generally adhesive sheets which are adhered with a contact-type adhesive directly to the surface to be covered. These liner products are generally offered in roll form and must be cut to proper size to fit the dimensions of a surface, such as a shelf. Once cut, the product is either adhered with the adhesive or with tacks to the shelf surface or it is simply positioned on top of the shelf, otherwise unsecured.

The benefits of using any covering such as shelf paper reside primarily in offering a decorative surface to the shelf while simultaneously providing a protective layer which will prevent damage, such as, for example, water damage to the shelf structure itself. Among the problems of present cover or liner products that do not include an adhesive backing is that the cover or liner shifts and lifts from the surface of the article to be covered while items stored on the shelf are positioned or removed therefrom. Cover or liner products that include a pressure sensitive adhesive are difficult to position correctly on the shelf and are difficult to remove. The adhesive discourages removal of the cover liner when replacement is desired, or upon removal, a portion of the adhesive is left on the surface of the shelf. Additionally, present adhesive backed shelf coverings that are labelled removable may lose their removable characteristics after repeated applications and gather dirt and lint on their adhesive surfaces.

Accordingly, a first object of the invention is to provide a covering or liner which overcomes the deficiencies of the prior art.

A second object of the invention is to provide a shelf liner material which is easy to install onto a shelf, yet includes a non-slip backing.

SUMMARY OF THE INVENTION

A removable non-skid, non-adhesive covering for a primary surface is provided. The covering comprises a substrate having a top surface and a bottom surface and a top sheet adhered to the top surface of the substrate. At least a portion of and preferably the entire, bottom surface of the substrate is a non-skid but non-adhesive. The covering further comprises a top sheet adhered to the top surface of the substrate. The non-skid bottom surface of the substrate prevents the covering from skidding tangentially or laterally relative to or in a plane parallel to the primary surface.

DETAILED DESCRIPTION OF THE PREFERRED EMBODIMENTS

Figure 1:
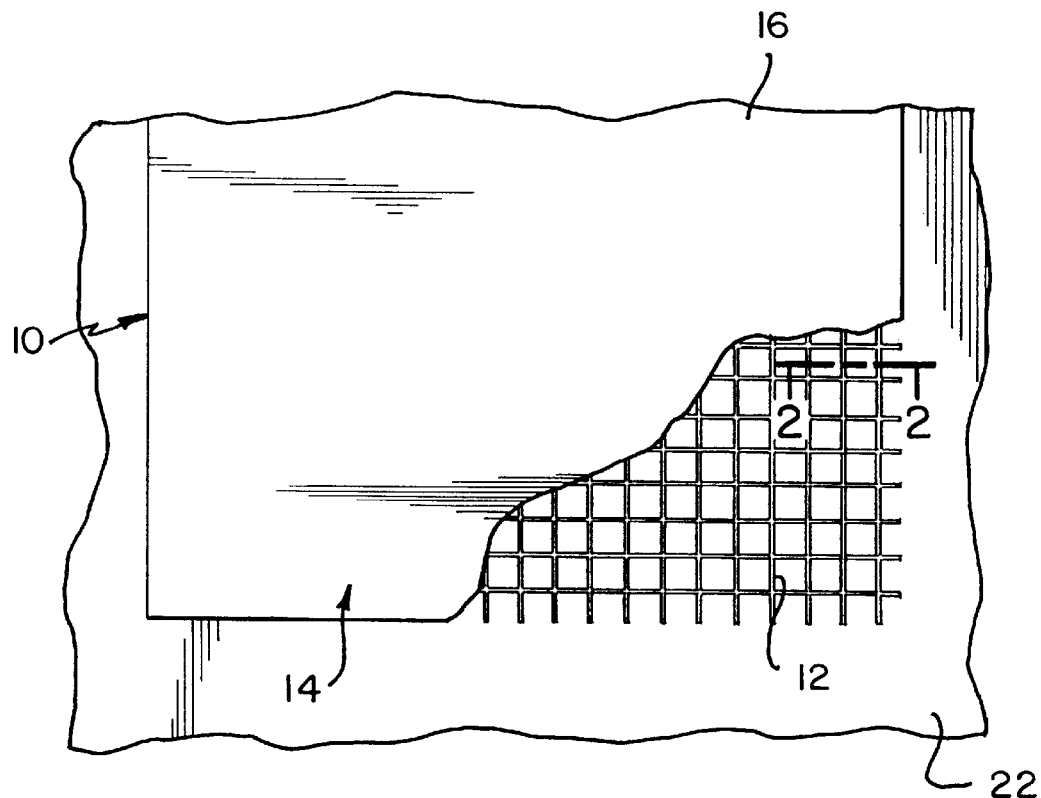
FIG. 1 is a partially sectional plan view of a portion of a removable, non-skid, non-adhesive covering in accordance with the invention.

Referring to FIG. 1, the removable, non-skid, non-adhesive covering of the present invention includes a top sheet 14 adhered to a substrate 12. The substrate 12 preferably is made from a woven scrim as illustrated in FIG. 1 or a non-woven scrim. A preferred substrate is a plastic scrim and may have a plurality of apertures. The substrate has a top and bottom surface and at least a non-skid effective portion of the bottom surface is a non-skid, non-adhesive surface. The term "non-skid" means inhibiting or hindering, but not preventing completely, slipping or sliding. The term "non-adhesive" means not fixing fastly. The term "adhered" means fixed fastly. While a non-skid material allows some discernible relative movement, an adhesive permits none. A non-skid effective portion is a portion sufficient to inhibit or hinder slipping or sliding of the covering tangentially, laterally, or in a plane parallel to the primary surface.

Typically, the scrim is made non-skid by coating at least a portion of and preferably the entire bottom surface with a non-skid material or a material which can become non-skid upon subsequent treatment such as, for example, curing. As shown in cross-section in FIG. 2, the substrate 12 includes a non-slip coating 18. The non-slip coating 18 is preferably made from a cured polyvinyl chloride resin and is applied to at least a portion of the bottom surface of the substrate 12 in a conventional manner to provide an exposed outer surface 20 having a high coefficient of friction. The non-skid coating can be applied to all of the substrate's surfaces (top and bottom) or to any appropriate portion(s) thereof, as well. It is this high friction coated bottom surface 20 which will contact a primary surface 22 and help to inhibit or hinder tangential and/or lateral displacement of the cover 10 with respect to the primary surface 22. The non-skid coating may be applied in a continuous conformation or may be discontinuous such as, for example, in spaced or random strips, discrete islands, or the like.

The preferred substrate 12 is a woven plastic scrim having a cured polyvinyl chloride resin non-slip coating 18. Such a substrate is commercially available from Manco, Inc., 830 Canterbury Rd., Westlake, Ohio.

Figure 2:
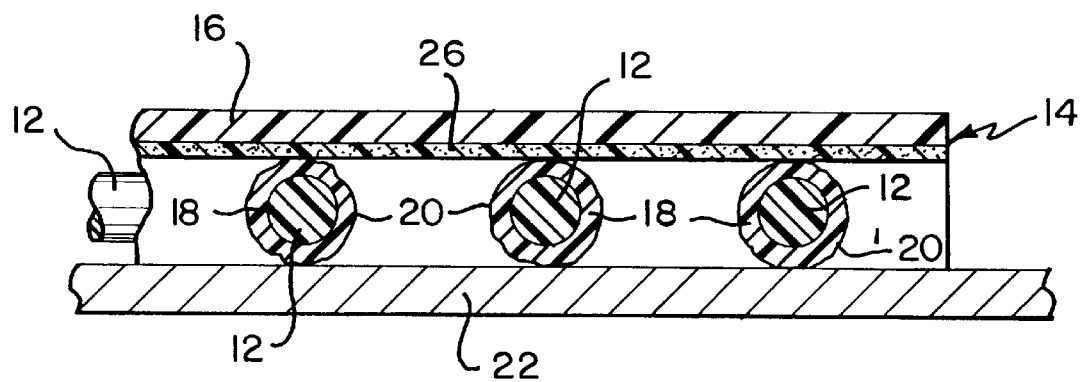
FIG. 2 is a sectional view of the shelf-liner taken along the lines 2—2 of FIG. 1, showing details of the laminated elements, in accordance with the invention.

The top sheet 14 includes a rear surface 24 which is adhered to the top surface 20 of the substrate, as shown in FIG. 2. Preferably, the top sheet is adhered with an adhesive such as, for example, a polyvinyl emulsion-based adhesive or an isocyanate-catalyzed polyvinyl emulsion adhesive. Examples of suitable adhesives include, but are not limited to, Henkel Nos. 3A-5416, 3B-5416, and 3C-5416 which are available from Henkel Adhesives Corporation, 1345 Gasket Drive, Elgin, ILL.

The top sheet can be of any material that is suitable for covering a primary surface such as, for example, a shelf surface. The top sheet can be, for example, paper, fabric, or the like. The top sheet can be porous or non-porous and waterproof or water resistant. The top sheet can optionally be coated with a suitable coating material such as an ink, wax, foil, other waterproofing, or the like. A preferred coating is suitable for incidental food contact. The coating can be pasted or printed on the top sheet or adhered in some other manner and can be patterned or decorative. A top sheet 14 is preferably made from paper and may include a printed design, pattern, or indicia on an upper, exposed surface 16.

The covering preferably is flexible and can be rolled or folded. The covering can also be cut to the desired dimensions, such as, for example, those of the primary surface without losing its non-skid, non-adhesive properties and without destroying the integrity of the cover.

Figure 3:
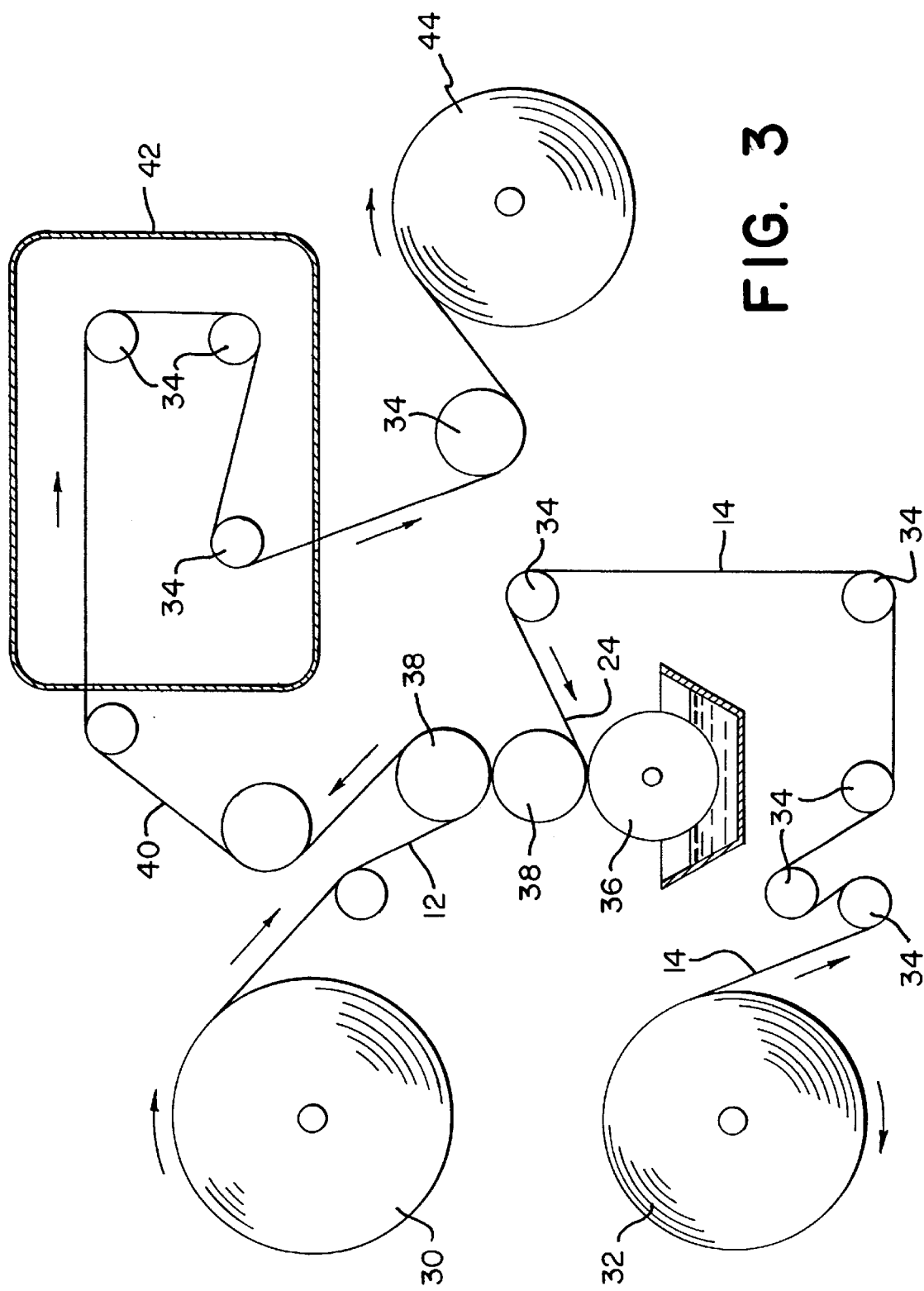
FIG. 3 is a schematic depicting the method of manufacture, in accordance with the invention.

Referring now to FIG. 3, a method for applying the top sheet 14 is illustrated as an exemplary schematic or a preferred method for securing the top sheet 14 to the substrate 12, using an adhesive 26. A roll 30 supplies substrate material 12 preferably already pre-treated with a non-slip coating 18. Another roll 32 supplies coated or uncoated top sheet material 14. The top sheet material 14 is fed through various idler and tensioning rollers 34, as is well known by those skilled in the art, to an adhesive application roller 36. The adhesive application roller 36 applies a controlled and evenly distributed amount of adhesive along the rear surface 24 of the top sheet 14 and/or on the top of the substrate. The adhesive may be applied to either interface surface of the respective substrate or top sheet or can be applied in spaced or random strips, separate islands, or the like. The adhesive application roller 36 may be conventional.

Once adhesive is applied to one or more interface surfaces such as the rear surface of the top sheet 14, the top sheet 14 and the substrate 12 meet between two pinch or press rollers 38 which apply a controlled and evenly distributed pressure. This pressure temporarily bonds the substrate 12 with the adhesive 26 and the top sheet 14, resulting in a laminate 40.

The laminate 40 preferably is cured in an appropriate oven 42 which ensures that the adhesive 26 cures bonding the top sheet 14 to the substrate 12. The final cover product 10 is rolled onto a pick-up roller 44 and later cut and packaged accordingly.

In another embodiment, the substrate 12 is coated with an appropriate adhesive 26 and similarly applied to the top sheet 14.

The top sheet 14 may be treated using any conventional machines to print a pattern or design on the upper surface 16 and apply a waterproof coating, such as any well known over-print-varnish (OPV). This can occur before, during or after the joining process.

Many variations of the present invention will suggest themselves to those skilled in the art in light of the above detailed description. All such modifications are within the full intended scope of the appended claims.

What is claimed is:

1. A removable covering for a primary surface, said covering comprising (a) a substrate having a top surface and a bottom surface, wherein at least a portion of said bottom surface comprises a non-skid, non-adhesive surface;

(b) a top sheet adhered to said top surface of said substrate, wherein when said non-skid bottom surface of said substrate is in contact with said primary surface, said covering does not skid tangentially or laterally relative to said primary surface; and further wherein said substrate is coated on at least said bottom surface with a non-skid cured polyvinyl containing resin.

2. A covering as defined in claim 1, wherein said substrate comprises a woven scrim.

3. A covering as defined in claim 2, wherein said substrate comprises a woven plastic scrim.

4. A covering as defined in claim 2, wherein said scrim has a plurality of apertures.

5. A covering as defined in claim 1, wherein said scrim comprises a non-woven scrim.

6. A covering as defined in claim 1, wherein said polyvinyl containing resin comprises a polyvinyl chloride resin.

7. A covering as defined in claim 1, wherein said substrate comprises a woven nylon scrim and wherein at least a portion of said bottom surface of said scrim is coated with a non-skid cured polyvinyl chloride resin.

8. A covering as defined in claim 1, wherein said top sheet is selected from the group consisting of a coated top sheet and an uncoated top sheet.

9. A covering as defined in claim 8, wherein said top sheet comprises paper.

10. A covering as defined in claim 8, wherein said coating is suitable for incidental food contact.

11. A covering as defined in claim 1, wherein said top sheet is adhered to said top surface of said substrate with an adhesive.

* * * * *